United States Patent [19]

Pulek

[11] Patent Number: 5,167,814

[45] Date of Patent: * Dec. 1, 1992

[54] FILTER APPARATUS SNAP LOCK CARTRIDGE RETAINER

[75] Inventor: John L. Pulek, Newington, Conn.

[73] Assignee: Cuno, Incorporated, Meriden, Conn.

[*] Notice: The portion of the term of this patent subsequent to Dec. 3, 2008 has been disclaimed.

[21] Appl. No.: 771,490

[22] Filed: Oct. 4, 1991

Related U.S. Application Data

[63] Continuation of Ser. No. 366,787, Jun. 15, 1989, Pat. No. 5,069,786.

[51] Int. Cl.$^5$ ............................................. B01D 29/17
[52] U.S. Cl. ..................................... 210/232; 210/238; 210/346; 210/486; 210/497.01
[58] Field of Search ...................... 210/232, 238, 323.2, 210/346, 357, 451, 455, 457, 462, 463, 486, 497.01, 497.2; 55/502

[56] References Cited

U.S. PATENT DOCUMENTS

| | | | |
|---|---|---|---|
| 1,203,661 | 11/1916 | Task . | |
| 2,550,070 | 4/1951 | La Brecque et al. | 29/148 |
| 3,149,072 | 9/1964 | Silverman | 210/232 |
| 3,151,071 | 9/1964 | Kasten | 210/232 |
| 3,438,502 | 4/1969 | Schmidt, Jr. et al. | 210/232 |
| 3,442,390 | 5/1969 | Petrucci et al. | 210/323 |
| 3,542,202 | 11/1970 | Ball | 210/232 |
| 3,615,016 | 10/1971 | Soriente et al. | 210/232 |
| 3,846,307 | 11/1974 | Petrucci et al. | 210/323 |
| 3,954,624 | 5/1976 | Petrucci | 210/439 |
| 4,022,693 | 5/1977 | Morgan, Jr. | 210/345 |
| 4,187,179 | 2/1980 | Harms | 210/238 |
| 4,247,394 | 1/1981 | Schmidt, Jr. | 210/767 |
| 4,248,713 | 2/1981 | Meier | 210/232 |
| 4,303,519 | 12/1981 | DelVecchio | 210/238 |
| 4,384,474 | 5/1983 | Kowalski | 73/38 |
| 4,419,234 | 12/1983 | Miller et al. | 210/232 |
| 4,436,633 | 3/1984 | Robinsky et al. | 210/791 |
| 4,507,201 | 3/1985 | Wall et al. | 210/232 |
| 4,514,298 | 4/1985 | Wall et al. | 210/232 |
| 4,522,717 | 6/1985 | Brust | 210/238 |
| 4,552,661 | 11/1985 | Morgan | 210/232 |
| 4,634,527 | 1/1987 | Marshall | 210/232 |
| 4,642,183 | 2/1987 | Herbert | 210/232 |
| 4,701,259 | 10/1987 | Rosaen | 210/450 |
| 4,725,323 | 2/1988 | Ostreicher et al. | 156/69 |
| 4,725,356 | 2/1988 | Zievers et al. | 210/323.2 |
| 4,767,530 | 8/1988 | Gilliam et al. | 210/232 |
| 4,806,240 | 2/1989 | Giordano et al. | 210/232 |
| 4,818,398 | 4/1989 | Lott et al. | 210/238 |
| 4,933,079 | 6/1990 | Kroha | 210/232 |
| 4,946,588 | 8/1990 | Wise | 210/232 |
| 4,948,505 | 8/1990 | Petrucci et al. | 210/238 |

FOREIGN PATENT DOCUMENTS 2349144 4/1975 Fed. Rep. of Germany .

Primary Examiner—Robert A. Dawson
Assistant Examiner—W. L. Millard
Attorney, Agent, or Firm—Renner, Kenner, Greive, Bobak, Taylor & Weber

[57] ABSTRACT

A filter apparatus for use in filtering a fluid is provided. The filter apparatus has a plug-in, quick-connect cartridge. The filter apparatus has walls forming a first chamber and a second chamber. The filter apparatus also has a diaphragm having a first surface and having a second surface for separating the chambers. The diaphragm has an aperture with an inner surface for receiving the cartridge. The cartridge has a connector member for attachment to the diaphragm, and has a filter member for filtering the fluid passing between the chambers. The first and second chambers have respective inlet and outlet ports. The connector member has an upset portion which bears against the diaphragm first surface. The connector member also has an extended portion, which extends through the aperture. The extended portion has a groove, which has a snap locking ring that bears against the diaphragm second surface. The upset portion and the snap locking ring provide a rigid cantilever attachment of the cartridge to the diaphragm. The extended portion also has a second groove, which has an O-ring seal that bears against the inner surface of the aperture for preventing fluid flow past the snap locking ring.

17 Claims, 4 Drawing Sheets

FILTER APPARATUS SNAP LOCK CARTRIDGE RETAINER

This application is a continuation of application Ser. No. 07/366,787, filed Jun. 15, 1989, now U.S. Pat. No. 5,069,786.

This invention relates to a filter apparatus, and in particular, to a filter apparatus having a plug-in cartridge with a snap-on ring.

BACKGROUND OF THE INVENTION

Field of the Invention

This invention is used in conjunction with prior art filter apparatus similar to that described in U.S. Pat. No. 4,187,179 to Harms. Apparatus similar thereto are sold by Cuno, Inc. (Meriden, Conn.), the assignee herein, as Type PC Cartridge-Pak Filters. Other relevant U.S. patents include:

U.S. Pat. No. 1,203,661 to Task;
U.S. Pat. No. 2,550,070 to Brecque, et al
U.S. Pat. No. 3,615,016 to Soriente, et al
U.S. Pat. No. 4,022,693 to Morgan, Jr.
U.S. Pat. No. 4,436,633 to Robinsky, et al
U.S. Pat. No. 4,507,201 to Wall, et al
U.S. Pat. No. 4,514,298 to Wall, et al
U.S. Pat. No. 4,552,661 to Morgan
U.S. Pat. No. 4,634,527 to Marshall
U.S. Pat. No. 4,642,183 to Hebert
U.S. Pat. No. 4,701,259 to Rosaen
U.S. Pat. No. 4,767,530 to Gilliam, et al Harms teaches a vessel having walls forming a first chamber and a second chamber and a cartridge pack having a diaphragm and at least one cartridge. Referring to the Figures in Harms, the diaphragm has at least one aperture through it. The cartridge has a perforated cylindrical tube 90 which passes through the aperture and has a portion extending through the aperture with a flange 94 and O-ring 96 for sealing against one diaphragm surface and cantilevering the cartridge therefrom. A coaxial filter member for filtering fluid passing between the first and second chambers has an end portion for sealing against the opposing diaphragm surface. Cap 95 is tightened onto tube 90 for bearing flange 94 and the end portion of the filter member against their respect diaphragm surfaces. Harms does not teach or suggest a filter cartridge which can be quickly and efficiently plugged into the diaphragm.

Task teaches a coffee percolator having a strainer for holding coffee which is placed in a funnel and held thereon by a divider spring ring.

Brecque, et al teaches a filtering unit having a "floating" support ring.

Soriente, et al teaches a multi-cartridge filter tank having filter cartridges mounted in the diaphragm with a quick release pin passing through an aperture in the cartridge head.

Morgan, Jr. teaches a bag shaped filter element fitting into an opening with a ring seated upon the shoulder of the opening to maintain the bag in place.

Robinsky, et al teaches a filtration apparatus having a filter unit suspended by a collar with a gasket from a diaphragm plate. A ring holds the filter cloth on the filter unit.

Wall, et al '201 and '298 describe a tube pressure filter assembly having retaining rings which fit in a groove in the filter core and which are locked in position by locking elements.

Morgan, teaches a liquid filter having a "snap-fit" self-retaining filter bag. More particularly, as shown in FIG. 4, lip 38 is resiliently engaged in and retained by edge 39.

Marshall, teaches a fluid filter element having an annular sealing member. Specifically, a flange or ring with annular seals, seals the filter element when installed in a sleeve. The lower edge portion of the flange of the filter element rests on the shoulder bounding the sleeve.

Hebert teaches an oil filter having an expansion ring used to outwardly bias a magnetic sleeve to retain it therein.

Rosaen teaches a fluid filter having replaceable filter basket with a seal ring resting upon an annular lip surface.

Gilliam, et al teaches a filter assembly having compressible strap having two handles which are joined in order to be retained in a closed position.

None of the references teach or suggest the quick connect/disconnect mechanism described and claimed herein to retain a filter cartridge in a diaphragm.

SUMMARY OF THE INVENTION

According to the present invention, a filter apparatus is provided. Such filter apparatus includes a vessel having walls forming a first chamber and a second chamber and includes a cartridge pack having a diaphragm for separating the chambers and at least one cartridge therein. The diaphragm has a first surface and a second surface and an aperture therein with an inner surface. The cartridge has a connector member and a coaxial, fixedly connected filter member for filtering fluid passing between the chambers. The connector member has an upset portion for bearing against the diaphragm first surface and has an extended portion extending through the aperture having a groove with a snap ring for bearing against the diaphragm second surface and for cantilevering the cartridge from the diaphragm.

The connector member having an upset portion bearing against the diaphragm first surface and having an extended portion with a snap ring bearing against the diaphragm second surface provides a rigid cantilever attachment of the cartridge to the diaphragm and provides a quick plug-in connecting or mounting means.

The foregoing and other objects, features and advantages will be apparent from the following description of the preferred embodiment of the invention as illustrated in the accompanying drawings.

DESCRIPTION OF THE PREFERRED EMBODIMENT

Figure 1:
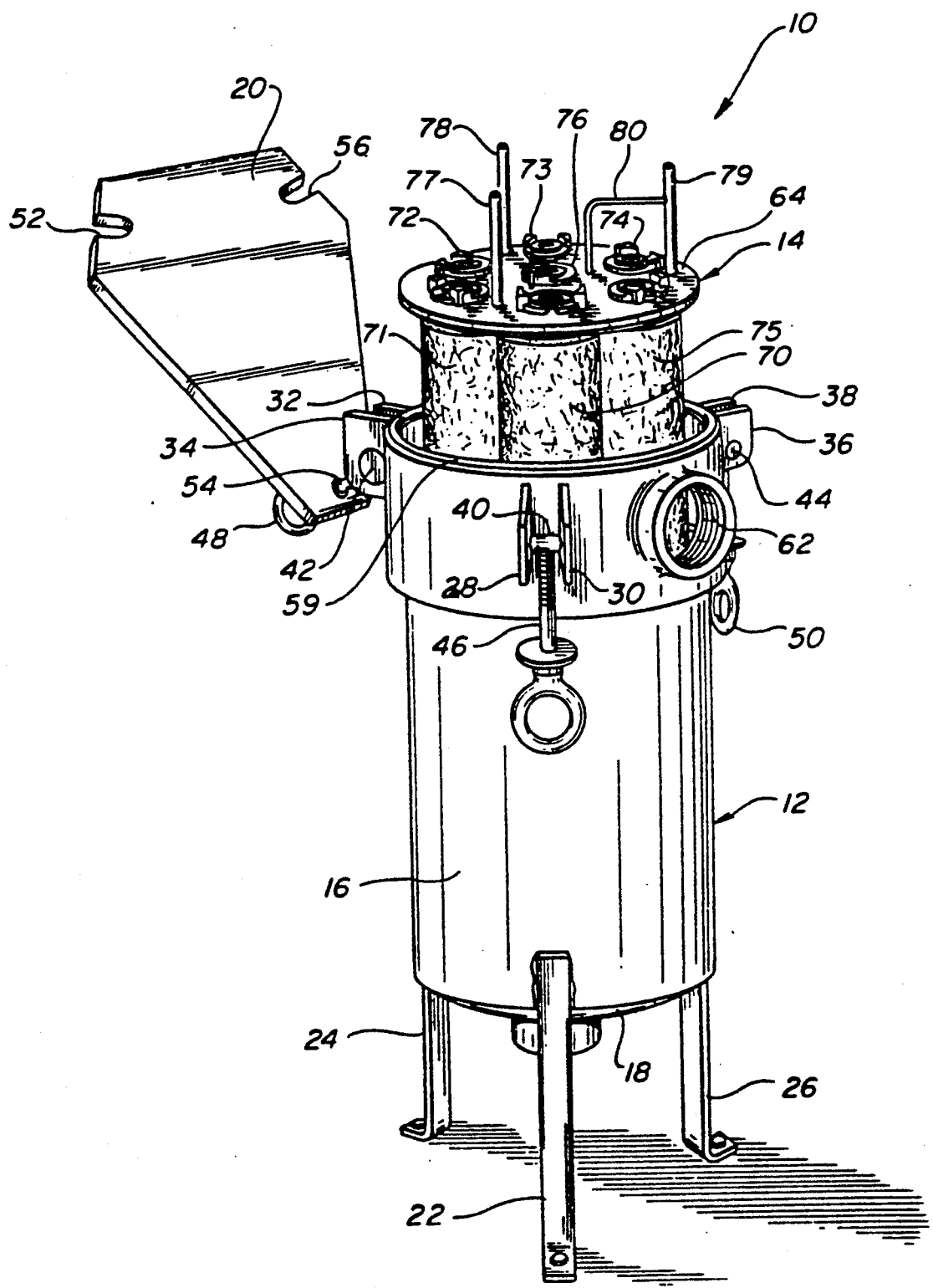
FIG. 1 is a perspective view of a filter apparatus according to the present invention.
Figure 2:
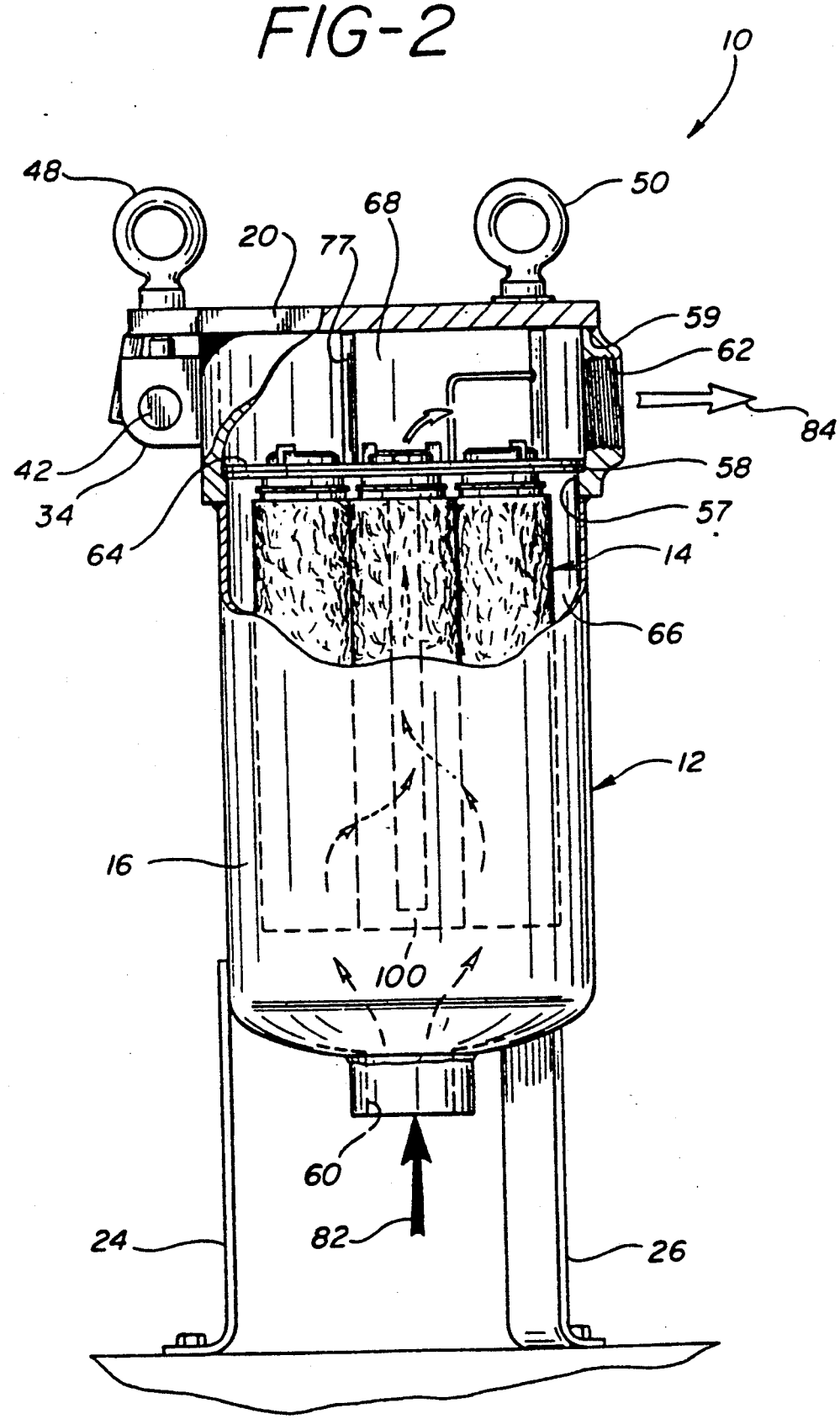
FIG. 2 is an elevation view of the filter apparatus of FIG. 1.

As shown in FIGS. 1 and 2, filter apparatus 10 includes vessel or housing 12 having disposed therein a cartridge assembly or pack 14.

Vessel 12 has peripheral wall 16, bottom wall 18 and top wall 20, and stands on three support legs 22, 24, 26.

Peripheral wall 16 has three pairs of hinge plates 28 and 30, 32 and 34, 36 and 38, with respective hinge bars 40, 42, 44 journaled therein and eye bolts 46, 48, 50 respectively threaded into the hinge bars. Top wall 20 has slotted holes 52, 56 respectively for receiving eye bolts 46, 50 and through hole 54 for eye bolt 48.

As shown in FIGS. 1 and 2, peripheral wall 16 has inner cylindrical shoulder portion 57, having gasket 58 for sealing pack 14. Peripheral wall 16 also has gasket 59 for sealing at top wall 20, and also has bottom inlet port 60 and top outlet port 62.

As shown in FIGS. 1 and 2, pack 14 has seven filter cartridges 70-76, which are cantilevered from diaphragm 64. Diaphragm 64 has thereon three vertical bars 77, 78, 79 for standing pack 14 in an upside down position after removal from vessel 12 for replacing cartridges 70-76. Bar 79 has a handle 80 for easily removing pack 14. Bars 77, 78, 79 hold diaphragm 64 in position after closing top wall 20.

Inlet port 60 has a fluid flow direction 82, and outlet port has a fluid flow direction 84. Fluid passes through inlet port 60, through lower chamber 66, then through cartridge pack 14, through upper chamber 68, then out through outlet port 62.

Figure 3:
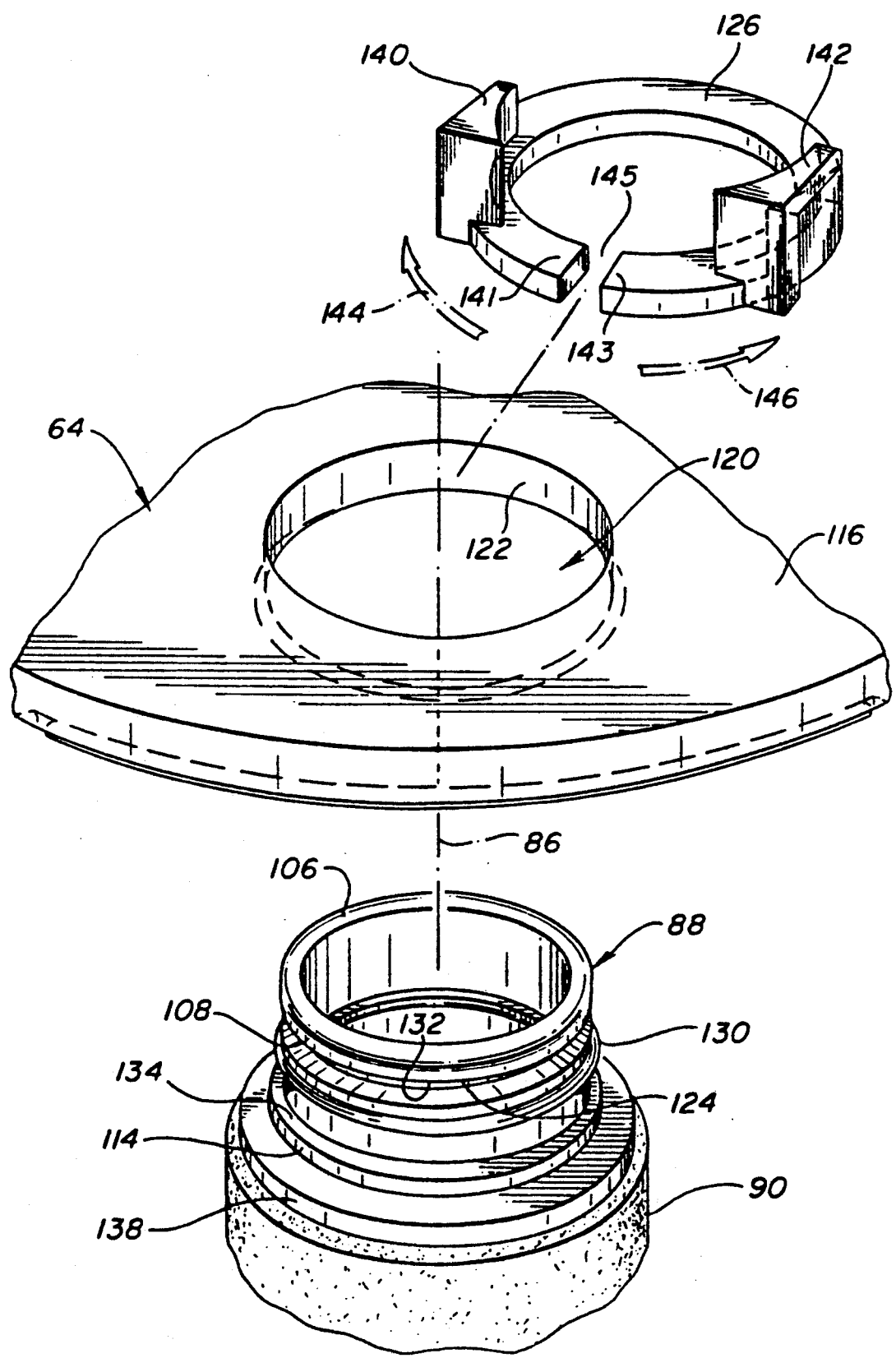
FIG. 3 is an exploded view of a portion of FIG. 1.
Figure 4:
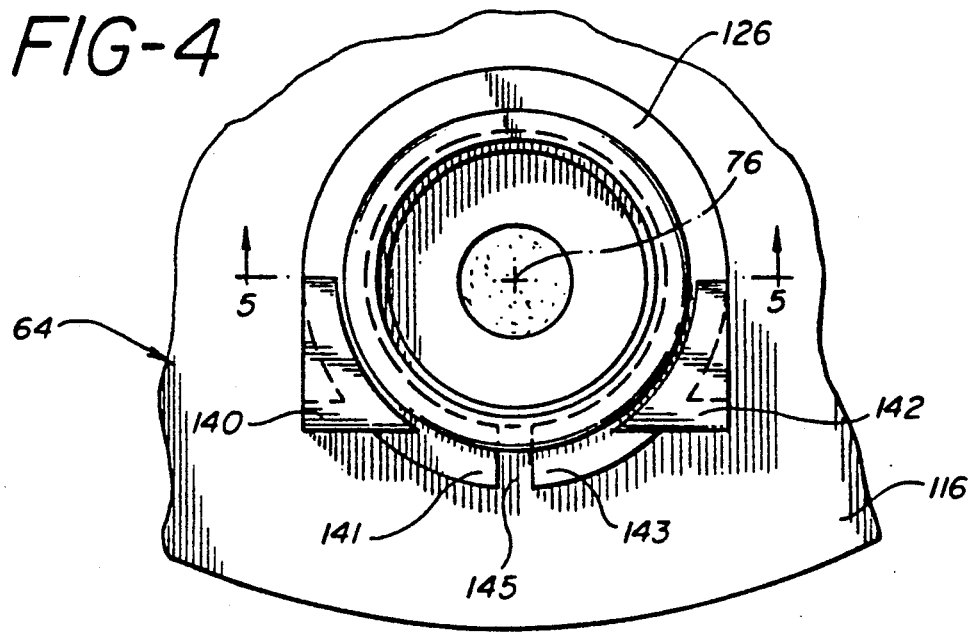
FIG. 4 is a plan view of the same portion of FIG. 1.
Figure 5:
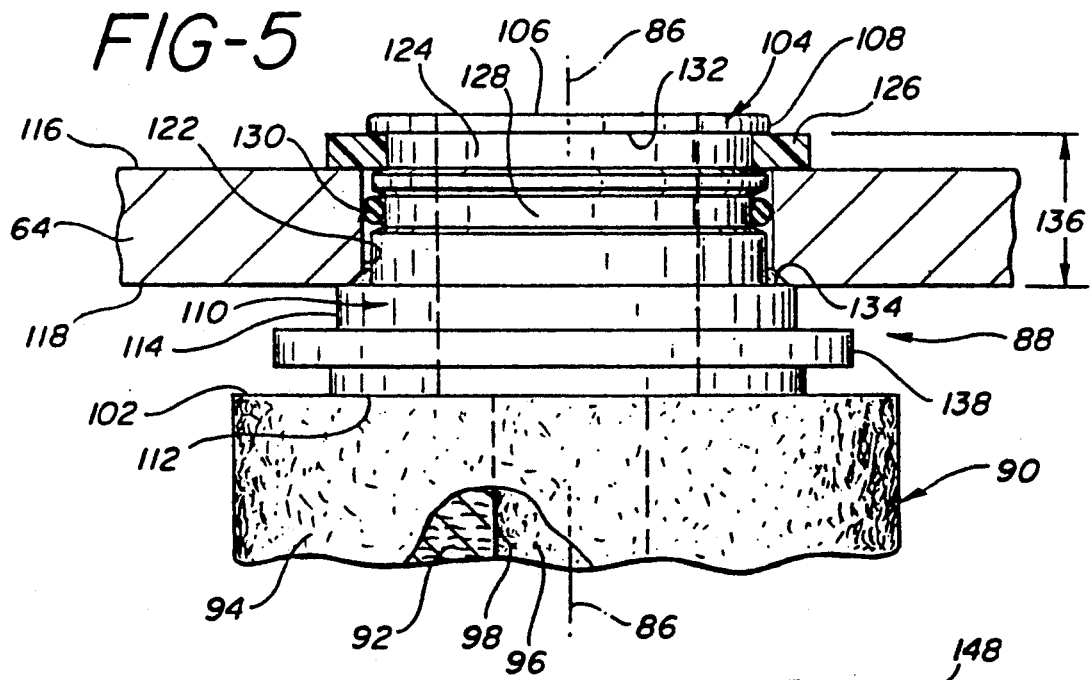
FIG. 5 is a section view taken along line 5—5 of FIG. 4.

As shown in FIGS. 3, 4 and 5, cartridge 70, which is substantially identical to cartridges 71-76, has an axis 86 and includes connector or support member 88, which is cantilevered from diaphragm 64 (see FIG. 1). Filter member 90, is fixedly connected to connector 88 coaxially therewith using conventional means (not shown).

As shown in FIG. 5, filter member 90, has cylindrical wall 92, with outer surface 94, and has elongate cavity 96 therein with inner surface 98. Bottom end wall 100 (FIG. 2), closes cavity 96 at one end, and top outer end surface 102 is at the other end. Fluid, in operation, passes through inlet port 60, through bottom chamber 66, through filter wall 92, through filter cavity 96, through upper chamber 68, and out through outlet port 62.

Referring to FIG. 5, connector member 88 has radially extended portion 104, with end surface 106 and radial outer surface 108. Connector member 88 also has connector portion 110, with end surface 112 and radial outer surface 114.

As shown in FIG. 3, diaphragm 64 has upper surface 116 and lower surface 118 and aperture 120 therein with inner surface 122.

Extended portion 104 has snap ring groove 124, which receives snap ring 126. Extended portion 104 also has seal ring groove 128 which receives O-ring seal 130.

Snap ring groove 124 has axial inner wall surface 132. Connector portion 110 has axial outer wall surface 134. Surfaces 132 and 134 are separated by selected dimension 136. Dimension 136 is slightly longer than the sum of thickness of snap ring 126 plus the thickness of diaphragm 64, so that snap ring 126 bears against surface 116 and surface 134 bears against surface 118. Connector portion 110 also has cylindrical projection 138.

Filter wall 92 is composed of a conventional filtering material. Connector 88 is composed of either a metal or a plastic material. O-ring seal 130 is composed of a rubber or elastomeric material. Diaphragm 64 is preferably metal such as stainless steel but is not limited thereto. Snap lock ring 126 is composed of a flexible, resilient polymeric material, such as polypropylene or polyethylene or the like.

Snap ring 126 has left portion 141 having a handle 140 thereon and a right portion 143 having a handle 142 thereon. Portions 141 and 143 of snap ring 126 are separated by a gap 145 (FIGS. 3, 4 and 6), so that manual removal is facilitated. By applying respective outward forces on ring ends 141, 143 through handles 140, 142, snap ring 126 is outwardly expanded in directions 144, 146 (FIG. 3). Handles 140, 142 are fixedly connected to snap ring 126 and preferably formed from and integral with snap ring 126.

Figure 6:
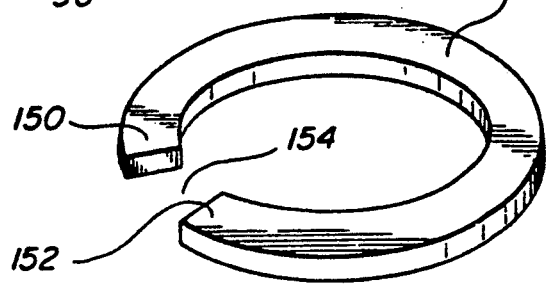
FIG. 6 is a perspective view of an alternate embodiment of a portion of FIG. 4.

As shown in FIG. 6, an alternate embodiment 148 is provided. Snap ring 148 corresponds to snap ring 126, but to minimize the cost of manufacture does not have handles. Snap ring 148 has end portions 150, 152, separated by gap 154. Gap 154 may be wider than corresponding gap 145 of ring 126 and has radially aligned opposite faces so that relatively less expansion and applied forces are required to open up gap 154 for removal of ring 148.

A typical cartridge 70, and identical cartridges 71-76, are preassembled with its connector 88 fixedly connected to filter member 90. The length of cartridge 70 is determined by the required fluid flow and like design characteristics. After cartridge 70 is plugged into diaphragm 64, and snap locking ring 126 is snapped onto groove 124, cartridge 70 is firmly retained in its respective aperture and prevented from dislocating from aperture 120 of diaphragm 64, as will be descried below.

Pack 14 can be preassembled as one unit for pack replacement. Cartridge 70 is preassembled for plug-in, quick-connect installation and for individual cartridge replacement.

Cartridge 70 is specifically assembled to diaphragm 64 as follows. First, cartridge 70 is inserted into aperture 120 which is formed in diaphragm 64. Extended portion 104 of connector 88 of cartridge 70 extends past upper surface 116 of diaphragm 64 when inserted. The circumferential groove 124 sits just above diaphragm surface 116. The snap locking ring 126 has an outer diameter which is larger than the diameter of inner surface 122 of diaphragm aperture 120. Snap locking ring 126 is installed in circumferential groove 124 so that cartridge 70 cannot be forced from diaphragm aperture 120. Snap locking ring handles 140, 142 expedite removal of snap locking ring 126. O-ring seal 130 prevents the unfiltered fluid in the lower chamber from mixing with the filtered fluid in the upper chamber by passing through the aperture 120.

The advantages of filter apparatus 10 are:

A) Cartridge 70 is restrained from being pushed out of diaphragm aperture 120 during fluid flow.

B) Connector 88 provides a rigid type of cantilever attachment of cartridge 70 to diaphragm 64.

C) Cartridge 70 provides a plug-in, quick-connect and preassembled type of cartridge. These attributes expedite and minimize the cost of filter care and maintenance.

D) Connector 88 minimizes deflection of its filter member 90 due to vibration which causes undesirable O-ring and connector-to-filter member wear.

E) Cartridge 70 avoids the need for an elongate perforated tube for support of filter member 90.

While the invention has been described in its preferred embodiment, it is to be understood that the words which have been used are words of description rather than limitation and that changes may be made within the preview of the appended claims without departing from the true scope and spirit of the invention in its broader aspects.

What is claimed is:

1. A filter apparatus comprising:
   (a) a vessel having walls forming a chamber;
   (b) a cartridge pack having a diaphragm for separating the chamber into a first and second chamber, said diaphragm having an upper and lower surface, and having at least one aperture therein;
   (c) at least one cartridge for filtering fluid passing between the first and second chambers having a connector member fixedly connected to a filter member, the connector member having a connector portion with a radially extending wall surface for bearing against the lower surface of the diaphragm and an extended portion projecting axially through said aperture with a groove;
   (d) a snap locking ring displaced in said groove, for bearing against the upper surface of the diaphragm cantilevering the cartridge therein.

2. The apparatus of claim 1, wherein said extended portion has a radially outer surface and said connector portion has a radially outer surface, said radially extending wall surface being formed at the juncture of said radially outer surfaces.

3. The apparatus of claim 2, wherein said radially outer surfaces are cylindrical.

4. The apparatus of claim 3, wherein said radially outer surface of said connector portion is of greater diameter than said radially outer surface of said extended portion.

5. A cartridge pack for a filter apparatus having a first chamber and a second chamber comprising:
   a diaphragm having a first surface and having a second surface for separating the chambers and having an aperture with an inner surface;
   at least one cartridge cantilevered from the diaphragm and having a connector member with an axis and having a coaxial filter member fixedly connected to said connector member for filtering fluid passing between the chambers, wherein
   said connector member has a radially extending wall surface for bearing against said first surface of said diaphragm and has an extended portion extending through said aperture and having a grove with a snap locking ring for bearing against said second surface of said diaphragm.

6. The apparatus of claim 5, wherein said extended portion has a radially outer surface and a connector portion of said connector member having a radially outer surface, said radially extending wall surface being formed at the juncture of said radially outer surfaces.

7. The apparatus of claim 6, wherein said radially outer surfaces are cylindrical.

8. The apparatus of claim 7, wherein said radially outer surface of said connector portion is of greater diameter than said radially outer surface of said extended portion.

9. A cartridge for a filter apparatus having a first chamber and having a second chamber and having a diaphragm having a first surface and having a second surface for separating the chambers and having an aperture with an inner surface for receiving the cartridge, comprising:
   a coaxial filter member fixedly connected to a connector member for filtering fluid passage between the chambers;
   said connector member having a radially extending wall surface for bearing against the diaphragm first surface; and
   said connector member having an extended portion extending through the aperture and having a groove for a snap locking ring for bearing against the diaphragm second surface.

10. The apparatus of claim 9, wherein said extended portion has a radially outer surface and a connector portion of said connector member having a radially outer surface, said radially extending wall surface being formed at the juncture of said radially outer surfaces.

11. The apparatus of claim 10, wherein said radially outer surfaces are cylindrical.

12. The apparatus of claim 11, wherein said radially outer surface of said connector portion is of greater diameter than said radially outer surface of said extended portion.

13. A snap locking ring for placement in a groove of a cartridge connector member and for axially bearing against a surface of a diaphragm which separates chambers of a filter apparatus, comprising:
   a discontinuous integral ring member having a first end portion and a second end portion separated by a gap;
   a first handle appendage fixedly connected to said first end portion and extending axially of said ring member; and
   a second handle appendage fixedly connected to said second end portion and extending axially of said ring member, whereby the application of outward forces on said handle appendages effects radial outward expansion of said ring member for manual insertion into and removal of the ring from the groove.

14. A snap lock ring according to claim 13, wherein said handle appendages are connected at substantially diametrically opposed locations on said ring member.

15. A snap lock ring according to claim 14, wherein said gap is located substantially circumferentially medially between said handle appendages.

16. A snap lock ring according to claim 13, wherein said handle appendages are formed integrally with said ring member.

17. A snap locking ring according to claim 13, wherein said integral ring member is composed of a flexible, resilient polymeric material.

* * * * *

UNITED STATES PATENT AND TRADEMARK OFFICE
CERTIFICATE OF CORRECTION

PATENT NO. : 5,167,814
DATED : 12/1/92
INVENTOR(S) : John L. Pulek

It is certified that error appears in the above-identified patent and that said Letters Patent is hereby corrected as shown below:

Column 6, line 12, "passage" should read --passing--.

Signed and Sealed this

Twenty-eighth Day of June, 1994

Attest:

BRUCE LEHMAN

Attesting Officer     Commissioner of Patents and Trademarks